(12) United States Patent
Goodman

(10) Patent No.: US 11,398,231 B2
(45) Date of Patent: *Jul. 26, 2022

(54) RECOMMENDING AUTOMATED ASSISTANT ACTION FOR INCLUSION IN AUTOMATED ASSISTANT ROUTINE

(71) Applicant: GOOGLE LLC, Mountain View, CA (US)

(72) Inventor: Michael Andrew Goodman, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/617,975

(22) PCT Filed: May 4, 2019

(86) PCT No.: PCT/US2019/030760
§ 371 (c)(1),
(2) Date: Nov. 27, 2019

(87) PCT Pub. No.: WO2019/217248
PCT Pub. Date: Nov. 14, 2019

(65) Prior Publication Data
US 2020/0175983 A1    Jun. 4, 2020

Related U.S. Application Data

(60) Provisional application No. 62/668,156, filed on May 7, 2018.

(51) Int. Cl.
| | | |
|---|---|---|
| *G10L 15/22* | (2006.01) | |
| *G10L 15/07* | (2013.01) | |
| *G10L 15/26* | (2006.01) | |

(52) U.S. Cl.
CPC .............. *G10L 15/22* (2013.01); *G10L 15/07* (2013.01); *G10L 15/26* (2013.01); *G10L 2015/223* (2013.01); *G10L 2015/225* (2013.01)

(58) Field of Classification Search
CPC ........... G06F 16/3334; G06F 16/90332; G06F 40/216; G06F 40/35; G06F 16/243;
(Continued)

(56) References Cited

U.S. PATENT DOCUMENTS 9,047,271 B1    6/2015 Mengibar et al.
9,715,496 B1    7/2017 Sapoznik et al.
(Continued)

FOREIGN PATENT DOCUMENTS

JP    2006317722    11/2006
JP    2018531404    10/2018
(Continued)

OTHER PUBLICATIONS

Rasch, K, "Smart Assistants for Smart Homes," octoral Thesis in Electronic and Computer Systems, Royal Instititue of Technology, Stockholm, Sweden; retrieved from internet: URL:http://www.diva-portal.org/smash/get/diva2:650328/fulltext01.pdf [retrieved Jan. 7, 2019]; 79 pages; Sep. 1, 2013 (Year: 2013).*

(Continued)

*Primary Examiner* — Angela A Armstrong
(74) *Attorney, Agent, or Firm* — Middleton Reutlinger

(57) ABSTRACT

Recommending an automated assistant action for inclusion in an existing automated assistant routine of a user, where the existing automated assistant routine includes a plurality of preexisting automated assistant actions. If the user confirms the recommendation through affirmative user interface input, the automated assistant action can be automatically added to the existing automated assistant routine. Thereafter, when the automated assistant routine is initialized, the
(Continued)

preexisting automated assistant actions of the routine will be performed, as well as the automated assistant action that was automatically added to the routine in response to affirmative user interface input received in response to the recommendation.

21 Claims, 5 Drawing Sheets

(58) Field of Classification Search
CPC .... G06F 16/24575; G06F 16/25; G06F 16/36; G06F 9/453; G06N 3/006; G06N 3/02; G06N 3/084; G06N 5/022; G10L 15/22; G10L 15/26; G10L 2015/223; G10L 15/07; G10L 2015/22
See application file for complete search history.

(56) References Cited

U.S. PATENT DOCUMENTS

| | | | |
|---|---|---|---|
| 10,546,023 B2* | 1/2020 | Ni | G06N 3/006 |
| 2001/0041980 A1 | 11/2001 | Howard et al. | |
| 2009/0228479 A1 | 9/2009 | Nishiyama | |
| 2015/0140990 A1* | 5/2015 | Kim | H04W 8/186 |
| | | | 455/418 |
| 2015/0269508 A1 | 9/2015 | Damboritz et al. | |
| 2016/0118048 A1 | 4/2016 | Heide | |
| 2016/0248847 A1 | 8/2016 | Saxena et al. | |
| 2017/0031711 A1 | 2/2017 | Wu et al. | |
| 2018/0081331 A1 | 3/2018 | Gary et al. | |
| 2018/0277123 A1 | 9/2018 | Boesen et al. | |
| 2018/0336269 A1 | 11/2018 | Dobrynin et al. | |
| 2020/0089709 A1* | 3/2020 | Ni | G06F 40/35 |

FOREIGN PATENT DOCUMENTS

| | | |
|---|---|---|
| JP | 2019537802 | 12/2019 |
| KR | 101741647 | 5/2017 |
| WO | 2014088588 A1 | 6/2014 |
| WO | 2016205147 A1 | 12/2016 |
| WO | 2017053208 | 3/2017 |

OTHER PUBLICATIONS

Sun, M. et al. "An Intelligent Assistant for High-Level Task Understanding"; Intelligent User Interfaces, ACM; XP058079698; DOI: 10.1145/2856767.2856818; ISBN: 978-1-4503-4137-0; pp. 169-174; Mar. 7, 2016.

Rasch, K. Smart Assistants for Smart Homes; Doctoral Thesis in Electronic and Computer Systems, Royal Instititue of Technology, Stockholm, Sweden; retrieved from internet: URL:http://www.diva-portal.org/smash/get/diva2:650328/fulltexto1.pdf [retrieved Jan. 7, 2019]; 79 pages; Sep. 1, 2013.

European Patent Office; International Search Report and Written Opinion for Ser No. PCTUS/2019/030760; 17 pages; dated Aug. 7, 2019.

Intellectual Property India; Examination Report issued in Application No. 202027048614; 5 pages; dated Aug. 30, 2021.

Japanese Patent Office; Notice of Allowance issued in Application No. 2020562676; 3 pages; dated Dec. 20, 2021.

European Patent Office; Communication pursuant to Article 94(3) EPC issued in Application No. 19729389.7, 16 pages, dated Jan. 11, 2022.

Pattar, S. et al., "Implementation of Home Automation through Internet of Things", Journal of Network Communications and Emerging Technologies, vol. 6, No. 12, www.jncet.org, 6 pages, dated Dec. 2016.

Rasch, K., "Smart assistants for smart homes", Doctoral Thesis in Electronic and Computer Systems, Royal Institute of Technology, Stockholm, Sweden; retrieved from internet: URL:http://www.diva-portal.org/smash/get/diva2:650328/FULLTEXT01.pdf, [retrieved on Jan. 7, 2019], 79 pages Sep. 2013.

Sun, M. et al., "An Intelligent Assistant for High-Level Task Understanding", Intelligent User Interfaces, ACM, 6 pages, Mar. 7, 2016.

Mayrhofer, R. et al., "Recognizing and Predicting Context by Learning from User Behavior", Radiomatics: Journal of Communication Engineering, special issue on Advances in Mobile Multimedia, retrieved from internet: URL:https://www.mayrhofer.eu.org/publications [retrieved on Jan. 7, 2019], 13 pages, May 2004.

The Korean Intellectual Property Office; Notice of Office Action issued in Application No. 10-2020-7033556; 6 pages; dated Jan. 27, 2022.

* cited by examiner

RECOMMENDING AUTOMATED ASSISTANT ACTION FOR INCLUSION IN AUTOMATED ASSISTANT ROUTINE

BACKGROUND

Humans can engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") can provide commands and/or requests using spoken natural language input (i.e. utterances) which may in some cases be converted into text and then processed, and/or by providing textual (e.g., typed) natural language input.

Automated assistants can perform a routine of multiple actions in response to, for example, receiving a particular command (e.g., a shortcut command). For example, in response to receiving a spoken utterance of "Good Night", an automated assistant can cause a sequence of actions to be performed, such as causing networked lights to be turned off, tomorrow's weather forecast to be rendered, and a user's agenda for tomorrow to be rendered. An automated assistant routine can be particularized to a user and/or to an ecosystem of client devices, and the user can be provided control to manually add certain actions to certain routines. For example, a first user can have a "Good Morning" automated assistant routine with a first set of good morning automated assistant actions defined by the first user, a "good night" automated assistant routine with a first set of good night automated assistant actions defined by the first user, and additional automated assistant routines with additional automated assistant actions defined by the first user. A separate second user can have a "good morning" automated assistant routine with a disparate set of good morning automated assistant actions defined by the second user, a "Good Night" routine with a disparate set of good night automated assistant actions defined by the second user, etc.

SUMMARY

As described herein, various automated assistant routines can be initiated in response to detecting a shortcut command in spoken or typed user interface input of a user, initiated in response to user interaction with a virtual or hardware element at a client device, initiated in response to detecting a user gesture, and/or initiated in response to other abbreviated user interface input(s). Abbreviated user interface inputs for initiating an automated assistant routine are abbreviated in that they require less user input, and/or less processing of the user input, than would otherwise be needed to cause performance of the actions of the automated assistant routine, but for the abbreviated user input. For example, a shortcut command that causes performance of an automated routine of a sequence of actions can be abbreviated in that it is shorter in length than the commands that would otherwise need to be spoken/typed, but for the condensed command, to cause the automated assistant to perform the set of actions. Various automated assistant routines can additionally or alternatively be initiated automatically upon the occurrence of one or more conditions, and optionally without requiring explicit user interface input. Such automatic initiation of an automated assistant routine can also require less user input and/or less processing of the user input, than would otherwise be needed to cause performance of the actions of the automated assistant routine.

Despite the existence of automated assistant routines, there are still various automated assistant actions that are not incorporated into any automated assistant routines of a user, and that the user instead performs through protracted interaction with an automated assistant and/or through protracted interaction with other computer application(s). Each occurrence of such a protracted interaction can consume significant computer and/or network resources. For example, to turn on networked lights in a kitchen via an automated assistant, a user can be required to speak "turn on the kitchen lights" or similar spoken utterance to an automated assistant interface of a client device. Audio data corresponding to the spoken utterance can be transmitted from the client device to remote systems. The remote systems can process the audio data (e.g., voice-to-text processing, natural language processing of the text, etc.) to determine an appropriate command for the spoken utterance, can transmit the command to an agent to cause the kitchen lights to be turned on, can receive a confirmation from the agent that the kitchen lights have been turned on, and can transmit data to the client device to cause the client device to render a notification that the lights have been turned on.

In view of these and other considerations, implementations disclosed herein relate to recommending an automated assistant action for inclusion in an existing automated assistant routine of a user, where the existing automated assistant routine includes one or more of preexisting automated assistant actions. If the user confirms the recommendation through affirmative user interface input, the automated assistant action can be automatically added to the existing automated assistant routine. Thereafter, when the automated assistant routine is initialized, the preexisting automated assistant actions of the routine will be performed, as well as the automated assistant action that was automatically added to the routine in response to affirmative user interface input received in response to the recommendation.

This obviates the need for the user to instead perform further resource intensive protracted interactions to cause the action to be performed. Rather, the action is performed as one of multiple actions of the automated assistant routine to which it is added. This can result in improved human-computer interactions through, for example, lessening a quantity of input that needs to be provided by a user (e.g., provided by a user to an automated assistant interface) to cause performance of the action. In addition to improving human-computer interaction, this can directly result in various computer and/or network efficiencies relative to, for example, instead requiring the user to provide further user interface input to cause the action to be performed. Further, as described above and elsewhere herein, the initialization of the automated assistant routine can be in response to abbreviated user interface inputs that can be efficiently processed and/or can be automatic upon the occurrence of condition(s) that don't require processing of user interface inputs. Yet further, recommending an automated assistant action for inclusion in an existing routine, and automatically adding the action to the routine in response to one-touch and/or single utterance (e.g., "yes, add") affirmative input, provides for efficient supplementing of existing routines. For example, automatically adding the action in response to simplified user interface input can be more computationally efficient than requiring a user to instead engage in a protracted interaction to manually add the action, such as a protracted interaction that requires the user to manually select a routine to be modified, specify an action for adding to the routine, confirm that the action should be added to the routine, etc.

Implementations disclosed herein can determine an automated assistant action for potentially recommending for inclusion in one or more automated assistant routines of a user. Further, the automated assistant action can be compared to each of a plurality of automated assistant routines that are stored in association with the user and, based on the comparing (e.g., if one or more criteria are satisfied), a subset (e.g., one) of the automated assistant routines can be selected. Graphical and/or audile user interface output can be rendered via a client device of the user, where the user interface output prompts the user to add the action to selected routine(s) of the subset. If affirmative user interface input is received in response to the user interface output, the automated assistant action can be automatically (e.g., without further user interface input being required) added to one of the selected routine(s) indicated by the affirmative user interface input. Thereafter, when the one of the selected routines is initiated, automatic performance of preexisting automated assistant actions of the routine can be initialized, as well as automatic performance of the added one of the selected action(s).

Various techniques can be utilized to determine an automated assistant action for potentially recommending for inclusion in one or more automated assistant routines of a user. In some implementations, determining the automated assistant action is based on the automated assistant action being initiated by the user via one or more instances of user interface input provided by the user. For example, an "adjust the smart thermostat to 72°" automated assistant action can be determined based on one or more previous instances of the user initiating the automated assistant action through spoken and/or other user interface input provided to the automated assistant. In some implementations, determining the automated assistant action is based on a different, but related, automated assistant action being initiated by the user via one or more instance of user interface input provided by the user. For example, a "grilling tips" automated assistant action, that causes a different tip related to grilling to be rendered each time it is performed, can be determined based on the user providing one or more past instance of user interface input related to grilling (e.g., "how long do I cook chicken on the grill"). In some implementations, determining the automated assistant action is based on determining the automated assistant action is related to one or more non-automated assistant interactions of the user. For example, an "adjust the smart thermostat to 72°" automated assistant action can be determined based on detecting one or more occurrences of the user adjusting the smart thermostat manually (e.g., through direct interaction with the smart thermostat) or adjusting the smart thermostat via a non-automated assistant application that is directed to control of the smart thermostat. The detecting can be based on, for example, a state change indication that is transmitted to the automated assistant and that indicates the smart thermostat was adjusted to 72°. The state change indication can be transmitted to the automated assistant by an agent that controls the smart thermostat, and can be pushed or provided in response to a state request from the automated assistant. In some implementations, determining the automated assistant action is based on determining the action may improve human-automated assistant interactions, without necessarily determining the user has performed the automated assistant action and/or related actions.

Selecting a subset of automated assistant routine(s) of a user, to which to recommend adding an automated assistant action, based on comparing the action to the routine(s), can increase the likelihood that correct routine(s) (if any) are recommended for the action, thereby mitigating risk of providing recommendations that will be ignored or dismissed. Further, rendering of a subset of automated assistant routines, in lieu of the entirety of the routines of the user, can conserve resources utilized in the rendering. In some implementations, the subset of automated assistant routines are selected based on comparing temporal attributes of past occurrences of the routines to temporal attributes of past occurrence(s) of the automated assistant action (or of an action related to the automated assistant action). For example, if past occurrences of an automated assistant action for a user have occurred only on weekday mornings, then a routine of the user that is frequently initiated on weekday mornings can be more likely to be selected for the subset than a routine of the user that is frequently initiated on weekday evenings, or a routine of the user that is frequently initiated on weekend mornings.

In some implementations, the subset of automated assistant routines are selected based on additionally or alternatively comparing device topology attribute(s) of device(s) utilized in the routines to device topology attribute(s) of device(s) utilized in the automated assistant action. For example, if an automated assistant action relates to control of a television having an assigned device topology attribute of "location=living room", then a routine that includes action(s) that control other device(s) having the assigned device topology attribute of "location=living room" (e.g., living room lights, living room speaker, etc.) can be more likely to be selected for the subset than a routine that lacks any action that controls a device having a "location=living room" device topology attribute. As another example, if an automated assistant action requires display of content via a device having an assigned device topology attribute of "display capable", then a routine that includes actions that control device(s) that are located in areas having a device with a "display capable" device topology attribute can be more likely to be selected for the subset than a routine that lacks any action that controls a device in an area having a device with a "display capable" device topology attribute.

In some implementations, the subset of automated assistant routines are selected based on additionally or alternatively excluding, from the subset, any routines that include a contradiction with the automated assistant action. For example, for an "adjust the smart thermostat to 72°" automated assistant action, a given routine can be excluded based on it having a conflicting "adjust the smart thermostat to 75°" action. Also, for example, for an automated assistant action that interfaces with an agent to perform a service that is only available in the evenings, a given routine can be excluded based on it occurring automatically in the mornings and not in the evenings.

In some implementations, multiple competing actions for adding to an automated assistant routine can be considered, and only a subset of (e.g., one of) the competing actions can be selected for actually recommending, via user interface output, for addition to a routine. In some of those implementations, each of the multiple competing actions can be compared to the routine and the selected action can be one of the multiple competing actions that most closely conforms to the routine, lacks any conflicts with the routine, and/or satisfies other criteria. In some additional or alternative implementations, the multiple competing actions can include a first action performed by a first agent and a second action performed by a second agent. For example, the first action can be causing jazz music to be rendered by a first agent that streams music and the second action can be causing jazz music to be rendered by a second agent that streams music. In some of those implementations, one of the first agent and the second agent can be selected based on one or more measures associated with the first agent and the second agent. Such measures can include, for example, frequency of use of the first agent and/or the second agent by the user; frequency of use of the first agent and/or the second agent by a population of users; ratings assigned to the first agent and/or the second agent (by the user and/or a population of users); and/or data provided by, or on behalf of, the first agent and/or the second agent that indicates an ability and/or desire of the respective agent(s) to perform the action.

In some implementations, user interface output that prompts the user to add an automated assistant action to at least one selected automated assistant routine can be provided at a conclusion of a performance of the selected routine, or a conclusion of a performance of the automated assistant action. For example, after performing a "Good Morning" routine, the automated assistant can provide a graphical and/or audible prompt of "by the way, it looks like Action X would be good to add to this routine, want me to add it" and, if affirmative input is received in response, "Action X" can be added to the "Good Morning" routine. Also, for example, after performing "Action X" in response to user interface input of the user (e.g., spoken input of "Assistant, perform Action X"), the automated assistant can provide a graphical and/or audible prompt of "by the way, it looks like this would be good to add to your Good Morning routine, want me to add it". If affirmative input is received in response, "Action X" can be added to the "Good Morning" routine. In these and other manners, the presented user interface output furthers a human-automated assistant interaction and, if affirmative input is received in response, reduces a quantity of user inputs that will be required in the future to perform both the preexisting actions of the routine, and the action added to the routine. For example, "Action X" can be controlling a connected device and the presented user interface input can further a human-automated assistant interaction by enabling a user to provide affirmative input in response and, as a result, causing controlling of the connected device to occur automatically in response to a further initiation of a corresponding routine.

In some implementations, in adding an automated assistant action to a routine, a position of performance of the automated assistant action, among preexisting actions of the routine, can be determined. In some versions of those implementations, the position can be determined based on a duration of user interface output (if any) that is required by the automated assistant action and duration(s) of user interface output (if any) that are required by the preexisting actions of the routine. For example, if the automated assistant action is controlling a smart device and requires no user interface output (or a very brief "device controlled" output), it can be positioned so that it is performed prior to one or more action(s) that require more enduring user interface output to be rendered. In some additional or alternative versions, the position of performance can be last, and can optionally occur with a temporal delay. The temporal delay can be based on, for example, temporal delay(s) of past performance of the automated assistant action (in response to past input(s) of the user) relative to past performances of the routine. For example, assume the automated assistant action is starting a brew cycle for a smart coffee maker and is added to a "Good Morning" routine. Further assume the automated assistant action was previously performed (prior to adding to the "Good Morning" routine) three times following conclusion of the good morning routine, in response to spoken utterances of "Assistant, brew my coffee". If the three spoken utterances occurred two minutes, three minutes, and four minutes following conclusion of the good morning routine, the automated assistant action can be added to the good morning routine with a temporal delay, such as a three minute (average of the three delays) temporal delay.

As referenced above, some automated assistant routines can be initialized in response to detecting a shortcut phrase or command in spoken or typed natural language input of a user. The shortcut command provides an abbreviated command for causing an automated assistant to perform a set of actions optionally in a particular sequence. Providing a shortcut command to cause performance of a set of actions in lieu of longer commands for the set of actions, can enable less user input to be provided (and transmitted and/or processed), thereby conserving computational and network resources. Additionally, automatically adding an automated assistant action as an additional action of a routine to be performed in response to an existing shortcut command, thereafter enables the additional action and the preexisting actions of the routine to be performed in response to the shortcut command. Thus, the shortcut command can thereafter be spoken or typed by the user in lieu of speaking both a command for the additional action and the shortcut command. As one example of an abbreviated command for an automated assistant routine, when a user wakes up in the morning, the user can trigger a "Good Morning" routine by providing a spoken utterance to a kitchen assistant device (i.e., a client computing device located in the kitchen). The spoken utterance can be, for example, "Good Morning," which can be processed by the assistant device and/or a remote assistant device (in communication with the assistant device) for initializing the "Good Morning" routine. For example, the assistant device and/or the remote device can process audio data corresponding to the spoken utterance to convert the spoken utterance to text, and can further determine the text "Good Morning" is assigned, for the user, to a set of automated assistant actions to be performed in response to a spoken utterance of "Good Morning". Adding a new action to the "Good Morning" routine in accordance with implementations described herein further assigns the new action, for the user, to the text "Good Morning".

Although various automated assistant routines can be initialized in response to a spoken or typed shortcut command, in some implementations, an automated assistant routine can additionally or alternatively be initialized in response to a user pressing a virtual or hardware element at a client device or peripheral device, performing a gesture that is detected via sensor(s) of a client device, providing other tactile input(s) at the client device, and/or providing any other type of computer-readable user interface input. For example, a graphical user interface (GUI) can be presented at a client device with a selectable icon, where the selectable icon provides a suggestion for the user to initialize the automated assistant routine. When the user selects the selectable icon (e.g., a GUI button that says "Good Morning"), the automated assistant can initialize the corresponding automated assistant routine in response. Additionally, or alternatively, an automated assistant routine can be initialized automatically, for instance, in response to an automated assistant detecting presence of a user (e.g., detecting a particular user using voice authentication and/or facial recognition), location of a user (e.g., detecting a particular user using voice authentication and/or facial recognition in a location such as at home, in the car, in the living room, and/or additional location(s)) an alarm being dismissed (e.g., a wake alarm set on an associated phone or other device), opening of an application, and/or other user action that can be recognized by an automated assistant (e.g., based on signals from one or more client devices). For example, a "Good Morning" routine can be initialized when a user is detected in the kitchen using facial recognition in "the morning" (i.e., at a specific time, during a range of times, and/or additional time(s) associated with the routine).

An example "Good Morning" routine can include actions such as causing a schedule of the user to be rendered, causing a particular appliance to be turned on, and causing a podcast to be rendered. Again, by enabling the automated assistant to be responsive to shortcut commands, the user does not necessarily need to provide a string of commands in order to cause the automated assistant to perform the corresponding actions (e.g., the user would not need to recite the spoken utterance: "Assistant, read me my schedule, turn on my appliance, and play my podcast."). Instead, the automated assistant can be responsive to a shortcut command, which the automated assistant can process in order to identify the actions corresponding to the shortcut command. In some implementations, a routine can be personalized, thereby enabling a particular shortcut command or other input that causes performance of a routine to cause a particular set of actions to be performed by the automated assistant for one user, whereas the same input would cause a different set of actions to be performed by the automated assistant for a different user. For example, a particular user may specifically configure the automated assistant to perform a first set of actions in response to a shortcut command, and a spouse of the particular user can configure the automated assistant to perform a second set of actions in response to the same shortcut command. The automated assistant can distinguish between users that provide the shortcut command using one or more sensor inputs and/or one or more determined characteristics such as voice signatures, facial recognition, image feeds, motion characteristics, and/or other data. Moreover, as described herein, the automated assistant can distinguish between users in determining automated assistant actions to be recommended to a given user, in determining automated assistant routine(s) that are specific to the user, and in determining when to provide user interface output that prompts for adding an automated assistant action to a routine of the user (e.g., user interface output particularized to a user can be provided only when it is determined that user is interacting with the automated assistant).

When a user provides a shortcut command, such as "Good Morning," to an assistant device, such as a kitchen assistant device, content corresponding to one or more actions of the routine can be initially rendered by the kitchen assistant device as a result of the spoken utterance being directed to the kitchen assistant device. For example, the content can initially be rendered exclusively at the kitchen assistant device (i.e., without simultaneously being rendered at any other client devices), despite other devices acknowledging the shortcut command. For example, multiple devices can acknowledge a shortcut command being received at their respective automated assistant interfaces, however, the device that receives the loudest and/or least distorted shortcut command can be designated as the device at which the automated assistant routine will be initialized.

If a user performs an action in an office with an office assistant device, the automated assistant can still suggest adding the action to the "Good Morning" routine. For example, if the user moves to their office after completing their "Good Morning" routine in the kitchen and then asks the office assistant device a spoken utterance regarding news headlines, the automated assistant can suggest adding the action of rendering news headlines to the "Good Morning" routine performed in the kitchen via the kitchen assistant device. In some implementations, the office assistant device can suggest adding actions performed in the office (i.e., rendering news headlines) to the "Good Morning" routine, even though the action is performed at a different device than the "Good Morning" routine. In some implementations, the office device can be utilized to suggest adding the action to render news headlines to the "Good Morning" routine while the user is the office after the user has asked the office assistant for news headlines. In other implementations, the kitchen assistant device can suggest the user add the new action of rendering news headlines to the "Good Morning" routine after the completion of the "Good Morning" routine while the user is still in proximity to the kitchen device. Additionally or alternatively, in some implementations the automated assistant can suggest to a user to add the action historically performed in the office when the user is detected in proximity of the kitchen device before the "Good Morning" routine is performed but after the user requests the routine through the shortcut command by the kitchen device.

In some implementations, limitations can be placed on the adding actions to automated assistant routines. For instance, a user that lives with a spouse may have a "Good Morning" routine and their spouse may have their own "Good Morning" routine. The user may not wish to add actions to their spouse's good morning routine (and vice versa). In some implementations, an automated assistant can determine if the user or their spouse is performing the action through sensor inputs and/or one or more determined characteristics such as voice signatures, facial recognition, image feeds, motion characteristics, and/or other data. In some implementations, the default setting on automated assistant routines in a multi user household can be for only the user of the routine to have permissions to modify their personal routines. In some implementations, a user can give permission to the automated assistant to allow other users, (such as their spouse) to add actions to their personal routines. Additionally, in some implementations, before suggesting a routine to add an action, an automated assistant can review actions in similar routines for other members of the household, if appropriate consents are obtained. For example, before suggesting adding an action to turn on a device such as a smart coffee maker to a user's good morning routine, the automated assistant can review the good morning routine of the spouse and determine if the action is already being performed in the household for the morning. In other words, when determining routines to suggest adding an action, the automated assistant can review the routines of a user and compare them with routines associated with other members of the household to, for example, prevent duplicate actions such as two users both turning on the coffee maker in the morning as part of their "Good Morning" routines.

In some implementations, in executing a routine, an automated assistant interfaces with one or more local and/or remote agents. For example, for a routine that includes three actions, an automated assistant can interface with a first agent in performing the first action, a second agent in performing the second action, and a third agent in performing a third action. As used herein, an "agent" references one or more computing devices and/or software that are utilized by an automated assistant. In some situations, an agent can be separate from the automated assistant and/or may communicate with the automated assistant over one or more communication channels. In some of those situations, the automated assistant may transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant. In some other situations, an agent may be a first-party (1P) agent, in that it is managed by the same party that manages the automated assistant.

An agent is configured to receive (e.g., over a network and/or via an API) an invocation request and/or other agent commands from the automated assistant. In response to receiving an agent command, the agent generates responsive content based on the agent command, and transmits the responsive content for the provision of user interface output that is based on the responsive content. For example, the agent may transmit the responsive content to the automated assistant for provision of output, by the automated assistant, that is based on the responsive content. As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

The above is provided as an overview of various implementations disclosed herein. Additional detail is provided herein regarding those various implementations, as well as additional implementations.

In some implementations, a method implemented by one or more processors is provided and includes determining an action initiated by an automated assistant. The action is initiated by the automated assistant in response to one or more instances of user interface input provided by a user via one or more automated assistant interfaces that interact with the automated assistant. The method further includes identifying a plurality of automated assistant routines that are stored in association with the user. Each of the automated assistant routines define multiple corresponding actions to be automatically performed via the automated assistant in response to initialization of the automated assistant routine, and the action is in addition to the actions of the automated assistant routines. The method further includes comparing the action to the plurality of automated assistant routines that are stored in association with the user. The method further includes selecting, based on the comparing, a subset of the automated assistant routines that are stored in association with the user. The method further includes, based on the action being initiated in response to user interface input provided by the user, and based on selecting the subset of the automated assistant routines: causing user interface output to be rendered via a client device of the user. The user interface output prompts the user to add the action to one or more of the automated assistant routines of the subset. The method further includes receiving affirmative user interface input in response to the user interface output, where the affirmative user interface input indicates a given routine of the automated assistant routines of the subset. The method further includes, in response to receiving the affirmative user interface input, automatically adding the action as an additional one of the multiple corresponding actions of the given routine to be automatically performed in response to initialization of the given routine.

These and other implementations of the technology disclosed herein can include one or more of the following features.

In some implementations, the one or more instances of user interface input include one or more spoken utterances that, when converted to text, is first text of a first length. In those implementations, initialization of the given routine occurs in response to a given spoken utterance that, when converted to text, is second text of a second length, and the second length is shorter than the first length.

In some implementations, causing the user interface output to be rendered via the client device of the user is further based on performing the given routine and occurs at a conclusion of performing the given routine.

In some implementations, the one or more instances of user interface input that initiated the action include a spoken utterance. In some versions of those implementations, the method further includes identifying a profile of the user based on one or more voice characteristics of the spoken utterance. In those versions, identifying the plurality of automated assistant routines that are stored in association with the user includes identifying the plurality of automated assistant routines based on the plurality of automated assistant routines being stored in association with the profile of the user. Further, in those versions, performing the given routine can occur in response to an additional spoken utterance from the user, and causing the user interface output to be rendered via the client device of the user can be further based on determining the additional spoken utterance has one or more voice characteristics that correspond to the profile of the user.

In some implementations, causing the user interface output to be rendered via the client device of the user occurs at a conclusion of the action initiated by the automated assistant in response to the one or more instances of user interface input.

In some implementations, the action includes providing a command to alter at least one state of a connected device that is managed by the automated assistant.

In some implementations, the action includes providing a command to an agent controlled by a third party that is distinct from a party that controls the automated assistant.

In some implementations, selecting the subset of the automated assistant routines includes: comparing the action with each of the multiple corresponding actions in each of the automated assistant routines; based on the comparing and for each of the automated assistant routines, determining if the action includes one or more contradictions with any of the multiple corresponding actions in the automated assistant routine; and selecting the subset of the automated assistant routines based on determining the multiple corresponding actions of the automated assistant routines of the subset lack the one or more contradictions with the action.

In some implementations, the one or more contradictions include a temporal contradiction and/or a device incompatibility contradiction. The temporal contradiction can include being unable to complete the action during a time frame of each of the multiple corresponding actions. The device incompatibility contradiction can include the action requiring a device having certain capabilities and each of the multiple corresponding actions not being associated with any device having the certain capabilities.

In some implementations, automatically adding the action includes determining a position for performing the action in the given routine, where the position is relative to the multiple corresponding actions of the given routine. In some versions of those implementations, the position for performing the action is before the multiple corresponding actions, after the multiple corresponding actions, or between two of the multiple corresponding actions. In some of those versions, the position is after the multiple corresponding actions and includes a temporal delay. The temporal delay can be based on one or more past temporal delays in past initiations of the action, by the user, following one or more past initiations of the given routine by the user.

In some implementations, the one or more instance of user interface input that initiated the action are received via an additional client device that is linked to, but separate from, the client device via which the user interface output is rendered.

In some implementations, the user interface output includes graphical output and the method further includes selecting the additional client device for providing the user interface output based on determining the client device lacks display capabilities and the additional client device includes display capabilities.

In some implementations, the one or more instance of user interface input that initiated the action include a spoken utterance, and the method further includes identifying a profile of the user based on one or more voice characteristics of the spoken utterance. In some of those implementations, identifying the plurality of automated assistant routines that are stored in association with the user is based on the plurality of automated assistant routines being stored in association with the profile of the user that is identified based on the voice characteristics of the spoken utterance.

In some implementations, a method implemented by one or more processors is provided and includes determining an automated assistant action and identifying a plurality of automated assistant routines that are stored in association with a user. Each of the automated assistant routines defines multiple corresponding actions to be automatically performed via the automated assistant in response to initialization of the automated assistant routine. The determined automated assistant action can be in addition to the multiple corresponding actions of the automated assistant routines. The method further includes comparing the automated assistant action to the plurality of automated assistant routines that are stored in association with the user. The method further includes selecting, based on the comparing, a subset of the automated assistant routines that are stored in association with the user. The method further includes determining, based on sensor data from one or more sensors of a client device that the user is interacting with the client device. The method further includes, based on determining that the user is interacting with the client device, and based on selecting the subset of the automated assistant routines, causing user interface output to be rendered via the client device, where the user interface output prompts the user to add the automated assistant action to one or more of the automated assistant routines of the subset. The method further includes receiving affirmative user interface input in response to the user interface output, where the affirmative user interface input indicates a given routine of the automated assistant routines of the subset. The method further includes, in response to receiving the affirmative user interface input: adding the automated assistant action as an additional one of the multiple corresponding actions of the given routine to be automatically performed in response to initialization of the given routine.

In some implementations, the adding is performed responsive to receiving the affirmative user interface input and without requiring any further user interface input.

In some implementations, the sensor data includes voice data that is based on one or more microphones of the client device, and determining that the user is interacting with the client device includes: determining one or more voice characteristics based on the voice data; and identifying the user based on the voice characteristics conforming to a profile of the user.

In some implementations, the automated assistant action includes controlling a particular connected device. In some versions of those implementations, comparing the automated assistant action to the plurality of automated assistant routines that are stored in association with the user includes: determining, based on a device topology of connected devices of the user, that the particular connected device and an additional connected device, controlled by least one of the multiple corresponding actions of the given routine, are both assigned to a same physical location in the device topology. In some of those versions, selecting, based on the comparing, the given routine for inclusion in the subset includes selecting the given routine for inclusion in the subset based on determining that the particular connected device and the additional connected device are both assigned to the same physical location. The same physical location can be, for example, a user assigned semantic identifier of a room within a home of the user.

In some implementations, the automated assistant action includes controlling a particular connected device and determining the automated assistant action includes: determining, based on a reported state of the particular connected device, that the particular connected device was controlled in a particular manner in response to a non-automated assistant interaction; and determining the automated assistant action to cause the particular connected device to be controlled in the particular manner.

In some implementations, comparing the automated assistant action to the plurality of automated assistant routines that are stored in association with the user includes: determining at least one action temporal property of the automated assistant action based on one or more past performances of the automated assistant action, or a related action, by the user; determining at least one routine temporal property of the automated assistant routine based on one or more past performances of the automated assistant routine; and comparing the at least one action temporal property to the at least one routine temporal property.

In some implementations, the automated assistant action includes interaction with a third party agent controlled by a particular third party, and determining the automated assistant action includes determining a past performance, by the user, of a separate interaction with a separate third party.

In some implementations, determining the automated assistant action is based on determining a relationship between a separate interaction and the automated assistant action.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media stor-

DETAILED DESCRIPTION

Implementations disclosed herein are directed to methods, apparatus, and computer-readable media (transitory and non-transitory) for determining whether to recommend an automated assistant action be incorporated into an automated assistant routine for a user. In some of those implementations, user interface output is rendered for presentation to the user when it is determined to recommend an action be incorporated into a routine. The user interface output can prompt the user as to whether he/she desires to add the action to the routine. Further, in some versions of those implementations, the action is added to the routine in response to affirmative user interface input being received in response to the user interface output. For example, the action can be automatically added to the routine in response to affirmative user interface input being received.

An example routine can be a morning routine, in which an automated assistant performs multiple different actions sequentially in the morning in order to prepare a user for their day. For instance, a morning routine can involve the automated assistant causing a schedule of the user for a particular day (e.g., the current day) to be audibly rendered via a client device, the automated assistant causing a device (e.g. smart lighting) to turn on, and then causing a podcast to be audibly rendered via the client device while the user is getting ready. After the completion of the morning routine, the user may cause performance an action which could be included in the morning routine. For example, the user may provide a spoken utterance to an assistant interface of a second client device after the morning routine is completed, where the spoken utterance causes the automated assistant to turn on an appliance associated with the automated assistant (e.g. a smart coffee maker). Based at least in part on temporal proximity of performance of the morning routine, and the user providing the spoken utterance that causes the automated assistant to turn on the appliance, a "turn on the appliance" action can be recommended for inclusion in the morning routine. If the user accepts the recommendation, the "turn on the appliance" action can be automatically added to the routine. Thereafter, instead of the user having to give the assistant a separate command to turn on the appliance, the automated assistant can cause the appliance to be turned on in response to initiation of the morning routine.

Figure 1:
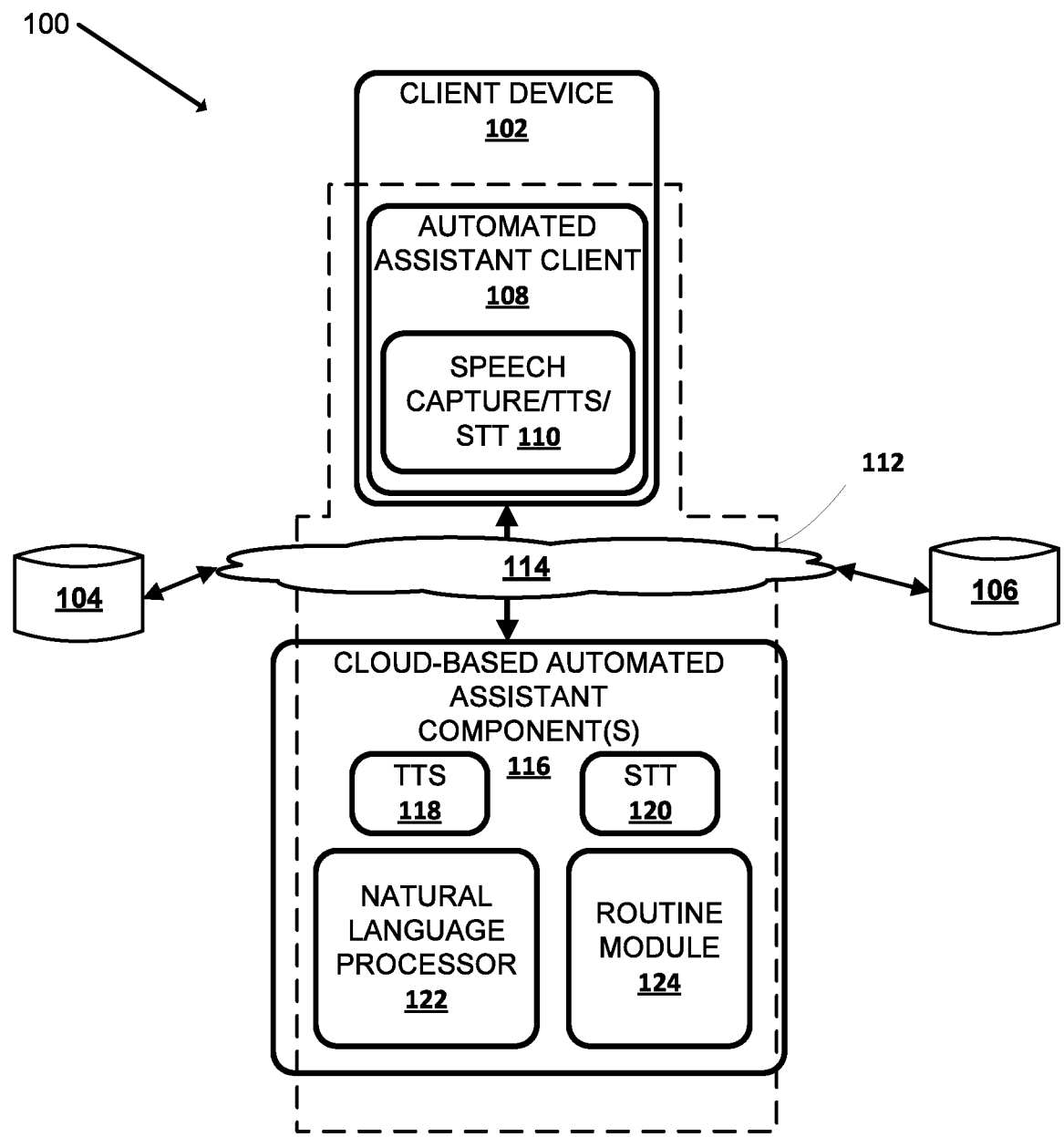
FIG. 1 is a block diagram illustrating an example environment in which various implementations can be implemented.

Turning now to the figures, FIG. 1 illustrates an example environment 100 in which various implementations can be implemented. The example environment 100 includes one or more client devices 102. Each client device may execute a respective instance of an automated assistant client 112. One or more cloud-based automated assistant components 116, such as natural language processor 122 and/or routine module 124, may be implemented on one or more computing systems (collectively referred to as a "cloud" computing system) that are communicatively coupled to client device 102 via one or more local and/or wide area networks (e.g., the internet) indicated generally as 114.

In various implementations, the instance of an automated assistant client 108, by way of its interactions with one or more cloud-based automated assistant components 116, may form what appears to be, from the user's perspective, a logical instance of an automated assistant 112 with which the user may engage in a dialog. One such instance of an automated assistant 112 is depicted in FIG. 1 by a dashed line. It thus should be understood that each user that engages with an automated assistant client 108 executing on client device 102, may, in effect, engage with their own logical instance of automated assistant 112. For the sake of brevity and simplicity, the term "automated assistant" as used herein as "serving" a particular user may often refer to the combination of an automated assistant client 108 operated by the user and one or more cloud-based automated assistant components 116 (which may be shared amongst multiple automated assistant clients 108). It should also be understood that in some implementations, automated assistant 112 may respond to a request from any user regardless of whether the user is actually "served" by that particular instance of automated assistant 112.

Client device 102 may include, for example, one or more of: a desktop computing device, a laptop computing device, a tablet computing device, a touch sensitive computing device (e.g., a computing device which can receive input via touch from the user), a mobile phone computing device, a computing device in a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, client device 102 may include one or more sensors (not pictured) that may come in various forms. Sensors can sense varying types of input to the automated assistant 112 such as verbal, textual, graphical, physical (e.g., a touch on a display device including a touch sensitive projector and/or a touch sensitive screen of a computing device), and/or visual (e.g., a gesture) based input. Some client devices 102 may be equipped with one or more digital cameras that are configured to capture and provide signal(s) indicative of movement detected in the fields of view. Additionally or alternatively, some client devices may be equipped with sensors that detect acoustic (or pressure) waves, such as one or more microphones.

Client device 102 and/or cloud-based automated assistant components 116 can be in communication with one or more devices 104. Devices 104 can include any of a variety of devices including: Internet of Things devices such as smart appliances, smart thermostats, smart coffee makers, smart lights, smart locks, etc. The devices 104 are linked with the client device 102 (and/or a particular user of the client device 102) and with one another. For example, the devices 104 can be linked to a profile assigned to the client device 102 (and optionally other client devices) and/or can be linked to a profile assigned to a user of the client device 102. Collectively, the client device 102, other client device(s), and the devices 104 can define a coordinated ecosystem of devices. In various implementations, devices are linked to one another via a device topology representation that can be user created, and/or automatically created, and that may define various assistant client devices, various smart devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or aliase(s) for the device (e.g. couch lamp, front door lock, bedroom speaker, kitchen assistant, etc.). In this manner, the identifiers of devices can be names, aliases, and/or locations of the respective devices that the user is likely to associate with the respective devices. As described herein, such identifier(s) can be utilized in various implementations disclosed herein. For example, such identifier(s) can be utilized in determining whether an automated assistant action conforms to an automated assistant routine.

Devices 104 can be directly controlled by automated assistant 112 and/or devices 104 can be controlled by one or more third party agents 106 hosted by remote device(s) (e.g., another cloud-based component). Furthermore, one or more third party agents 106 can also perform function(s) that are in addition to controlling devices 104 and/or controlling other hardware devices. For example, the automated assistant 112 can interact with a third party agent 106 to cause a service to be performed, a transaction to be initiated, etc. For instance, a user voice command "order a large pepperoni pizza from Agent X" can cause the automated assistant client 108 (or cloud-based automated assistant component(s) 116) to send an agent command to a third party agent "Agent X". The agent command can include, for example, an intent value that indicates an "ordering" intent determined from the voice command, as well as optional slot values such as "type=pizza", "toppings=pepperoni", and "size=large". In response, the third party agent can cause an order for a large pepperoni pizza to be initiated and provide, to the automated assistant 112, content that indicates the order was successfully initiated. The content (or a conversion thereof) can then be caused to be rendered to the user via output device(s) (e.g., speaker(s) and/or display(s)) of the client device 102. As described herein, some implementations can recommend that the "order a large pepperoni pizza from Agent X" action and/or similar actions be added to an existing routine of a user. When added to an existing routine of the user, the "order a large pepperoni pizza from Agent X" automated assistant action can then be initiated in response to initiation of the existing routine, without the user having to separately provide a spoken utterance of "order a large pepperoni pizza from Agent X". Accordingly, transmission and/or processing of audio data that captures such a spoken utterance can be obviated, thereby conserving computer and/or network resources.

In many implementations, automated assistant 112 may engage in dialog sessions with one or more users via user interface input and output devices of one or more client devices 102. In some implementations, automated assistant 112 may engage in dialog sessions with a user in response to user interface input provided by the user via one or more user interface input devices of one of the client devices 102. In some of those implementations, the user interface input is explicitly directly to automated assistant 112. For example, a user may speak a predetermined invocation phrase, such as "OK, Assistant," or "Hey, Assistant," to cause automated assistant 112 to begin actively listening. In many implementations, a user may speak a predetermined shortcut phrase to begin running a routine such as "OK Assistant, Good Morning" to begin running a good morning routine.

In some implementations, automated assistant 112 may engage in a dialog session in response to user interface input, even when that user interface input is not explicitly directly to automated assistant 112. For example, automated assistant 112 may examine the contents of user interface input and engage in a dialog session in in response to certain terms being present in the user interface input and/or based on other cues. In many implementations, automated assistant 112 may utilize speech recognition to convert utterances from users into text, and respond to the text accordingly, e.g., by providing visual information, by providing search results, by providing general information, and/or taking one or more response actions (e.g., playing media, launching a game, ordering food, etc.). In some implementations, the automated assistant 112 can additionally or alternatively respond to utterances without converting the utterances into text. For example, the automated assistant 112 can convert voice input into an embedding, into entity representation(s) (that indicate entity/entities present in the voice input), and/or other "non-textual" representations and operate on such non-textual representations. Accordingly, implementations described herein as operating based on text converted from voice input my additionally and/or alternatively operate on the voice input directly and/or other non-textual representations of the voice input.

Each of the client computing devices 102 and computing device(s) operating cloud-based automated assistant components 116 may include one or more memories for storage of data and software applications, one or more processors for accessing data and executing applications, and other components that facilitate communication over a network. The operations performed by one or more computing device 102 and/or automated assistant 112 may be distributed across multiple computer systems. Automated assistant 112 may be implemented as, for example, computer programs running on one or more computers running in one or more locations that are coupled to each other through a network.

As noted above, in various implementations, client computing device 102 may operate an automated assistant client 108. In various implementations, each automated assistant client 108 may include a corresponding speech capture/text-to-speech("TTS")/speech-to-text("STT") module 110. In other implementations, one or more aspects of speech capture/TTS/STT module 110 may be implemented separately from the automated assistant client 108.

Each speech capture/TTS/STT module 110 may be configured to perform one or more functions: capture a user's speech, e.g., via a microphone (which in some cases may comprise sensors in client device 102); convert that captured audio to text (and/or to other representations or embeddings); and/or convert text to speech. For example, in some implementations, because a client device 102 may be relatively constrained in terms of computing resources (e.g., processor cycles, memory, battery, etc.), the speech capture/TTS/STT module 110 that is local to each client device 102 may be configured to convert a finite number of different spoken phrases—particularly phrases that invoke automated assistant 112—to text (or other forms, such as lower dimensionality embeddings). Other speech input may be sent to cloud-based automated assistant components 116, which may include cloud-based TTS module 118 and/or cloud-based STT module 120.

Cloud-based STT module 120 may be configured to leverage the virtually limitless resources of the cloud to convert audio data captured by speech capture/TTS/STT module 110 into text (which may then be provided to natural language processor 122). Cloud-based TTS module 118 may be configured to leverage the virtually limitless resources of the cloud to convert textual data (e.g., natural language responses formulated by automated assistant 112) into computer-generated speech output. In some implementations, TTS module 118 may provide the computer-generated speech output to client device 102 to be output directly, e.g., using one or more speakers. In other implementations, textual data (e.g., natural language responses) generated by automated assistant 112 may be provided to speech capture/ TTS/STT module 110, which may then convert the textual data into computer-generated speech that is output locally.

Automated assistant 112 (e.g., cloud-based assistant components 116) may include a natural language processor 122, the aforementioned TTS module 118, the aforementioned STT module 120, and other components, some of which are described in more detail below. In some implementations, one or more of the engines and/or modules of automated assistant 112 may be omitted, combined, and/or implemented in a component that is separate from automated assistant 112. In some implementations, to protect privacy, one or more of the components of automate assistant 112, such as natural language processor 122, speech capture/ TTS/STT module 110, routine module 124, etc., may be implemented at least in part on client device 102 (e.g., to the exclusion of the cloud).

In some implementations, automated assistant 112 generates responsive content in response to various inputs generated by a user of client device 102 during a human-to-computer dialog session with automated assistant 112. Automated assistant 112 may provide the responsive content (e.g., over one or more networks when separate from a client device of a user) for presentation to the user as part of the dialog session. For example, automated assistant 112 may generate responsive content in response to free-form natural language input provided via client device 102. As used herein, free-form input is input that is formulated by the user that is not constrained to a group of options presented for selection by the user.

Natural language processor 122 of automated assistant 112 processes natural language input generate by users via client device 102 and may generate annotated output for use by one or more components of automated assistant 112. For example, the natural language processor 122 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. Also, for example, in some implementations the natural language processor 122 may additionally and/or alternatively include a dependency parser (not depicted) configured to determine syntactic relationships between terms in natural language input.

In some implementations, the natural language processor 122 may additionally and/or alternatively include an entity tagger (not depicted) configured to annotate entity references in one or more segments such as references to people (including, for instances, literary characters, celebrities, public figures, etc.), organizations, locations (real and imaginary), and so forth. The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster", references to the same entity based on one or more contextual cues. For example, the coreference resolver may be utilized to resolve the term "there" to "Hypothetical Café" in the natural language input "I liked Hypothetical Café last time we ate there."

In many implementations, one or more components of the natural language processor 122 may rely on annotations from one or more other components of the natural language processor 122. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 122 may use related prior input and/or other related data outside of the particular natural language input to determine one or more annotations.

Routine module 124 of automated assistant 112 can determine a candidate action for adding to an automated assistant routine of a user, can determine a subset of available routines of the user to which to recommend adding the candidate action, can provide a recommendation for adding the action to the routine(s) of the subset, and can add the action to one of the routines based on affirmative input, that indicates the one of the routines, being received in response to the recommendation. Routine module 124 can be implemented by cloud-based automated assistant components 116 as depicted, and/or implemented by automated assistant client 108 of client device 102.

In some implementations, routine module 124 determines automated assistant actions for potentially recommending for adding to routines of a user, based on the actions being initiated by the user through interacting with one or more instances of automated assistant 112. In some implementations, the routine module 124 additionally or alternatively determines automated assistant actions for potentially recommending for adding to a routine of a user, based on related, but different, actions being initiated by the user through interacting with one or more instances of automated assistant 112. In some implementations, the routine module 124 additionally or alternatively determines automated assistant actions for potentially recommending for adding to a routine of a user, based on data associated with the user indicating the user has likely performed the actions or related actions. The data associated with the user can include data based on interactions of the user with other non-automated assistant applications, data based on states of smart devices in response to direct user control of those smart devices, data indicating locations and/or transactions of the user, etc.

In some implementations, routine module 124 can access a stored list of routines for the user, and determine a subset of the routine(s) for which to recommend adding a determined automated assistant action. In some of those implementations, routine module 124 selects the subset of automated assistant routines based on comparing temporal attributes of past occurrences of the routines to temporal attributes of past occurrence(s) of the automated assistant action (or of an action related to the automated assistant action). For example, if the automated assistant action is a "decrease smart thermostat set point 3°" action determined based on past occurrences of the user manually adjusting the smart thermostat, times for those past occurrences can be determined based on times of state updates from the smart thermostat that reflects those decreases. Further, a routine of the user that is frequently initiated near (e.g., within an hour of) those times can be more likely to be selected for the subset than a routine of the user that is rarely or never initiated near those times.

In some of those implementations, routine module 124 additionally or alternatively selects the subset of automated assistant routines based on comparing device topology attribute(s) of device(s) utilized in the routines to device topology attribute(s) of device(s) utilized in the automated assistant action. For example, if an automated assistant action relates to control of a component of a vehicle of a user having an assigned device topology attribute of "location=vehicle", then a routine that includes action(s) that control other device(s) having the assigned device topology attribute of "location=vehicle" can be more likely to be selected for the subset than a routine that lacks any action that controls a device having a "location=vehicle" device topology attribute.

In some of those implementations, routine module 124 additionally or alternatively selects the subset of automated assistant routines excluding, from the subset, any routines that include a contradiction with the automated assistant action. For example, for a "dim the living room lights to 50%" automated assistant action, a given routine can be excluded based on it having a conflicting "turn off the living room lights" action. Also, for example, for an automated assistant action that interfaces with an agent to perform a service that results in on-demand delivery of items to a home of a user, a given routine can be excluded based on it being assigned to a "work" location of the user (e.g., explicitly, or based on being associated only with linked devices having a "work" device topology attribute).

In some implementations, routine module considers multiple competing actions for adding to an automated assistant routine, and selects only a subset of (e.g., one of) the competing actions can for actually recommending, via user interface output, for addition to a routine. In some of those implementations, each of the multiple competing actions can be compared to the routine and the selected action(s) can be one or more of those that most closely conform to the routine, lack any conflicts with the routine, and/or satisfy other criteria.

Regardless of the techniques utilized to determine action(s) and/or routine(s) to which the action(s) can be added, the routine module 124 can cause user interface output to be added that prompts the user as to whether to add the action(s) to the routine(s). In some implementations, in recommending adding an action to a routine, the routine module 124, causes corresponding user interface output to be rendered in response to user interaction with the automated assistant to perform the action (e.g., after the action has been completed in response to the user interaction). In some implementations, in recommending adding an action to a routine, the routine module 124, causes corresponding user interface output to be rendered in response to an initiation of the routine (e.g., before performing any actions of the routine, or after completion of all actions of the routine).

If affirmative user interface input is received in response to a recommendation provided by routine module 124, the routine module 124 can cause the corresponding action to be added to the corresponding routine. For example, the routine module 124 can add the action automatically to the routine without requiring any further user interface input from the user. In some implementations, in adding an automated assistant action to a routine, the routine module 124 can determine a position of performance of the automated assistant action, among preexisting actions of the routine. In some versions of those implementations, the position can be determined based on a duration of user interface output (if any) that is required by the automated assistant action and duration(s) of user interface output (if any) that are required by the preexisting actions of the routine. In some additional or alternative versions, the position of performance can be last, and can optionally occur with a temporal delay.

Figure 2:
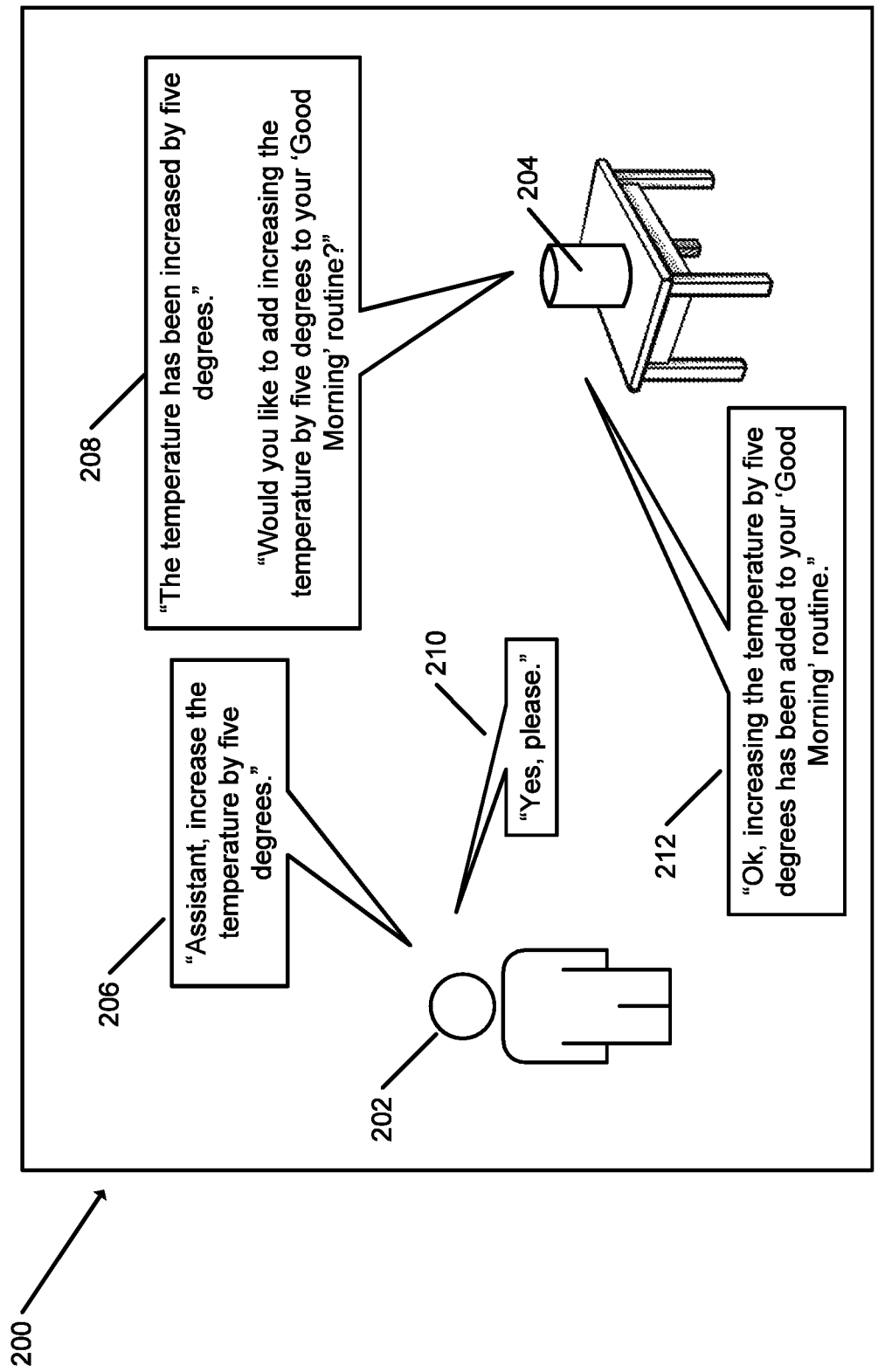
FIG. 2 is a diagram illustrating an example interaction between a user and an automated assistant.

An example of a user interacting with client device to add an action to an automated assistant routine is illustrated in FIG. 2. Image 200 contains a scene of a room including user 202 and client device 204. User 202 interacts with client device 204 via a spoken utterance indicated in dialog box 206. The spoken utterance of dialog box 206 requests that the automated assistant perform an action that causes a five degree increase of a set point of a smart thermostat that is linked with the client device 204. The automated assistant associated with the client device 204 can process the spoken utterance to determine an appropriate command for causing the set point of the smart thermostat to be increased by five degrees. In some implementations, the automated assistant associated with the client device 204 can interface directly with the smart thermostat to change the temperature. For example, the automated assistant can provide the command directly to the smart thermostat. Additionally or alternatively, the automated assistant can interface with a third party agent associated with the smart thermostat to change the temperature. For example, the automated assistant can provide the command to a third part agent which, in turn, generates and transmits a corresponding command to the smart thermostat to effectuate the temperature change.

In some implementations, client device 204, as shown in dialog box 208 can render audible user interface input confirming that the temperature has been increased and can further make a recommendation to add increasing the temperature by five degrees to the user's "Good Morning" routine. This recommendation can include a prompt asking if the user wants to add the action to the recommended routine. In some implementations, this recommendation can be made if the user generally increases the temperature in the morning after completing their "Good Morning" routine. In some implementations, this recommendation can be made even if the user performs the "Good Morning" routine using a first client device and the user changes the temperature using a second client device.

Before making this recommendation, the automated assistant associated with client device 204 can select the "Good Morning" routine, from a plurality of other routines of the user, as the routine to which the "temperature increase" automated assistant action should be recommended for addition. Various techniques can be utilized to select the "Good Morning" routine to the exclusion of other routines of the user, such as various techniques described in detail herein.

The user can decided if they want to add the action to the recommend routine or not and respond to prompt via a further spoken utterance indicated by dialog box 210. If the user responds affirmatively to the prompt, as indicated by the spoken utterance of dialog box 210, the automated assistant automatically adds the action to the "Good Morning" routine of the user. Further, the automated assistant causes further audible user interface output to be provided via the client device 204, as indicated by dialog box 212, where the further audible output confirms increasing the temperature by five degrees has been added to the "Good Morning" routine. However, in some implementations, this confirmation can be optional. Additionally or alternatively, client device 204 can confirm the action has been added to the routine the next time the user runs the routine. In various implementations where a user has given, for example, their spouse permission to add actions to the user's routines, this can provide an additional confirmation to the user that they want the action added in a particular routine.

In some implementations, user 202 can provide input to the client device 204 to cause the client device to interact with one or more third party agents to cause performance of an action that is not an action that controls a smart device. For example, instead of requesting the temperature be changed, the user can use the client device 204 to make an online order from the third party agent associated with a "Local Coffee Shop", and then pick up their ordered coffee on their way to work. The user can interact with the automated assistant associated with the client device 204 in making such an order, or with a separate application of the client device 204. In many implementations, an automated assistant associated with client 204 (such as routine module 124 thereof that is described above in FIG. 1) can determine the coffee ordering action, and determine whether to recommend adding that action to the "Good Morning" routine and/or other automated assistant routine(s) of the user. For example, if a user makes a coffee order from "Local Coffee Shop" using client device 204 every morning immediately after the completion of the "Good Morning" routine, the automated assistant action can determine, based at least in part on the temporal proximity of the action to the "Good Morning" routine, to recommend adding the action to the "Good Morning" routine. In some implementations, a user can delay making a coffee order from "Local Coffee Shop" using client device 204 by, for example, an average of 25 minutes after the client device 204 completes rendering the "Good Morning" routine (i.e., the user makes the order as they are leaving home, which occurs on average 25 minutes after completion of the "Good Morning" routine), so the user has a hot cup of coffee waiting when they arrive at "Local Coffee Shop". In some of those implementations, the coffee order from "Local Coffee Shop" can still be added to the "Good Morning" routine, so that it is performed automatically in response to performance of the "Good Morning" routine, and along with other preexisting actions of the "Good Morning" routine. However, the automated assistant can optionally include a delay (e.g., 25 minutes after the completion of the last action in the preexisting "Good Morning" routine) before the "Good Morning" routine makes a coffee order from "Local Coffee Shop" for the user via the third party agent. Additionally or alternatively, the automated assistant can add it to the "Good Morning" routine in a manner that causes a prompt (e.g., "ready to order your coffee") to be provided after a delay following completion of the last action in the preexisting "Good Morning" routine, and the order only initiated if affirmative input is received in response to the prompt.

Additionally or alternatively, in some implementations, if the user makes a coffee order from "Local Coffee Shop" using client device 204 only one time, the automated assistant can review the actions in the "Good Morning" routine. For example, if the routine includes turning on a coffee maker, it is possible the user simply ran out of coffee that morning, and the automated assistant should not recommend adding the coffee order to the "Good Morning" routine. However, in some implementations, if the user frequently visits "Local Coffee Shop" in the morning even if they do not preorder coffee in advance using a client device, the automatic assistant can decide to recommend adding making the coffee order action to the "Good Morning" routine.

Furthermore, an automated assistant can suggest adding an automated assistant action to a routine, even if the user has had no previous interaction with a third party via which the action will be performed. For example, a user could be unaware of a new coffee shop "New Coffee Shop", which opened last month and is in a convenient location on the route between the user's home and work. An action that causes coffee to be ordered at the "New Coffee Shop" could be recommended for adding to a user's "Good Morning" routine that currently lacks any coffee ordering action. Additionally or alternatively, in some implementations, the action that causes coffee to be ordered at the "New Coffee Shop" could be recommended for adding to an existing routine, and replacing an existing action of the routine that causes coffee to be ordered at an alternative coffee shop.

In some implementations, a user can be presented with more than one action for potentially adding to a routine, where each of the actions are associated with a different third party agent. For example, a user who makes a daily morning coffee order via client device 204 from "Local Coffee Shop" can be presented with a recommendation to add any one of three separate actions to an existing "Good Morning" routine. Each of the three actions can cause a coffee order to be initiated, but a first can cause it to be ordered with "Local Coffee Shop", a second can cause it to be ordered with 'New Coffee Shop", and a third can cause it to be ordered with "Classic Coffee Shop". In some implementations, each of the actions can be presented with corresponding additional information such as: the amount of time visiting the corresponding coffee shop will increase and/or decrease the user's commute, the corresponding price of a coffee order, corresponding rewards program, and/or other information to help the user make an informed decision regarding which coffee shop to add to their "Good Morning" routine. In some implementations, one or more of the recommended actions can be recommended based on a corresponding party providing pecuniary consideration for its inclusion. In some implementations, an amount of pecuniary consideration required for inclusion can be related to how closely the action matches the routine for which it is being suggested for addition, how frequently the routine is performed by the user, and/or other criteria.

Although spoken utterances of user 202 and audible outputs of client device 204 are illustrated in FIG. 2, additional or alternative user inputs can be provided by the user 202 and/or content rendered via additional or alternative modalities by the client device 204. For example, the user 202 could additionally or alternatively provide typed input, touch inputs, gesture inputs, etc. Also, for example, output can additionally or alternatively be graphically rendered by the client device 204. As one particular instance, the client device 204 can graphically render a prompt for adding an action to a routine, along with a selectable interface element that can be selected by touch interaction of the user 202 to cause the action to be automatically added to the routine.

Figure 3:
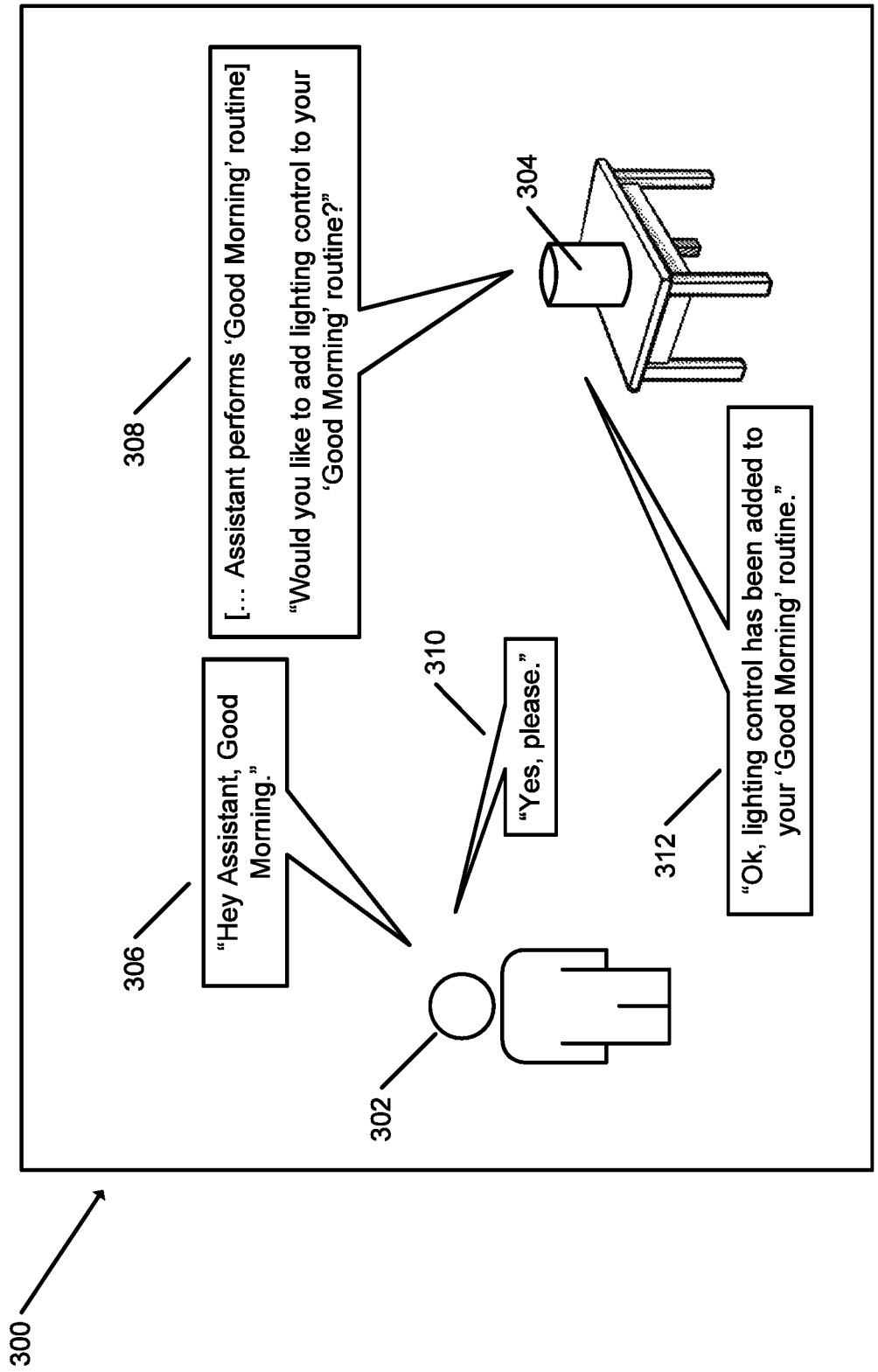
FIG. 3 is a diagram illustrating another example interaction between a user and an automated assistant.

An additional example of a user interacting with a client device to add an action to an automated assistant routine is illustrated in FIG. 3. Image 300 contains a scene of a room including user 302 and client device 304. User 302 can interact with client device 304 to begin a routine by providing a spoken utterance that includes a predefined shortcut phrase. For example, in dialog box 306, user 302 begins a "Good Morning" routine by providing a spoken utterance that is detected by client device 304 and that includes the phrase "Good Morning". The automated assistant associated with client device 304 can process audio data that captures the spoken utterance, determine the spoken utterance includes the shortcut phrase for the "Good Morning" routine, and, in response cause performance each action in the "Good Morning" routine. In some implementations, the automated assistant, via client device 304, can ask user 302 upon completion of the routine if they would like to add an action to the just completed routine. For example, dialog box 308 indicates client device 304 has performed the user's "Good Morning" routine and then asks if the user would like to add lighting control to their "Good Morning" routine. Additionally or alternatively, in some implementations, client device 304 can ask if a user would like to add lighting control to their "Good Morning" routine before running the routine, and including the new action as part of running the routine.

In many implementations, the automated assistant associated with client device 304 can determine this recommendation to add a new action to the just completed routine (in this case the "Good Morning" routine) based on the user's historical actions. For example, the recommendation can be determined based on the user always turning on their smart lights using the client device 304 upon completion of the "Good Morning" routine. Additionally or alternatively, in some implementations, a user may have smart light(s) in their house, but be unaware of the ability to control the smart lights utilizing the automated assistant and thus have not previously utilized to automated assistant to control the smart lights. In such an example, the automated assistant can make the recommendation based on determining that the user has not performed the lighting control action, in an attempt to add functionality to user routines the user might otherwise be unaware of. Additionally or alternatively, in some implementations, the automated assistant can make recommendation based on determining that control of smart lights is an action that other users frequently have in related routines. For example, the assistant can make a recommendation, to add lighting control to a "Good Morning" routine if over 90% of users who have devices required for lighting control (as determined via the user's device topology) also have a lighting control action in their "Good Morning" routines.

A user can decided to add the suggested action to the routine or not. For example, dialog box 310 indicates the user affirmatively decided to add the suggested action (i.e., lighting control) to their "Good Morning" routine. However, a user is not required to add a recommend action to a suggested routine. In some implementations, the client device 304 associated with the automated assistant can confirm the recommended action was added to the routine. For example, dialog box 312 indicates lighting control has been added the users "Good Morning" routine. However, in various implementations, client device 304 can confirm with a user that an action has been added to a particular routine the next time the user runs that routine. In some implementations, this can provide an additional backup to confirm the user still wants the new action in the routine and has not changed their mind the next time the routine. Furthermore, in some implementations, a user can give other's permission to modify their routines. In some such implementations, confirming a new action has been added before a user runs a routine can allow a user to confirm an action a different user, such as the user's spouse, added to the user's routine.

Figure 4:
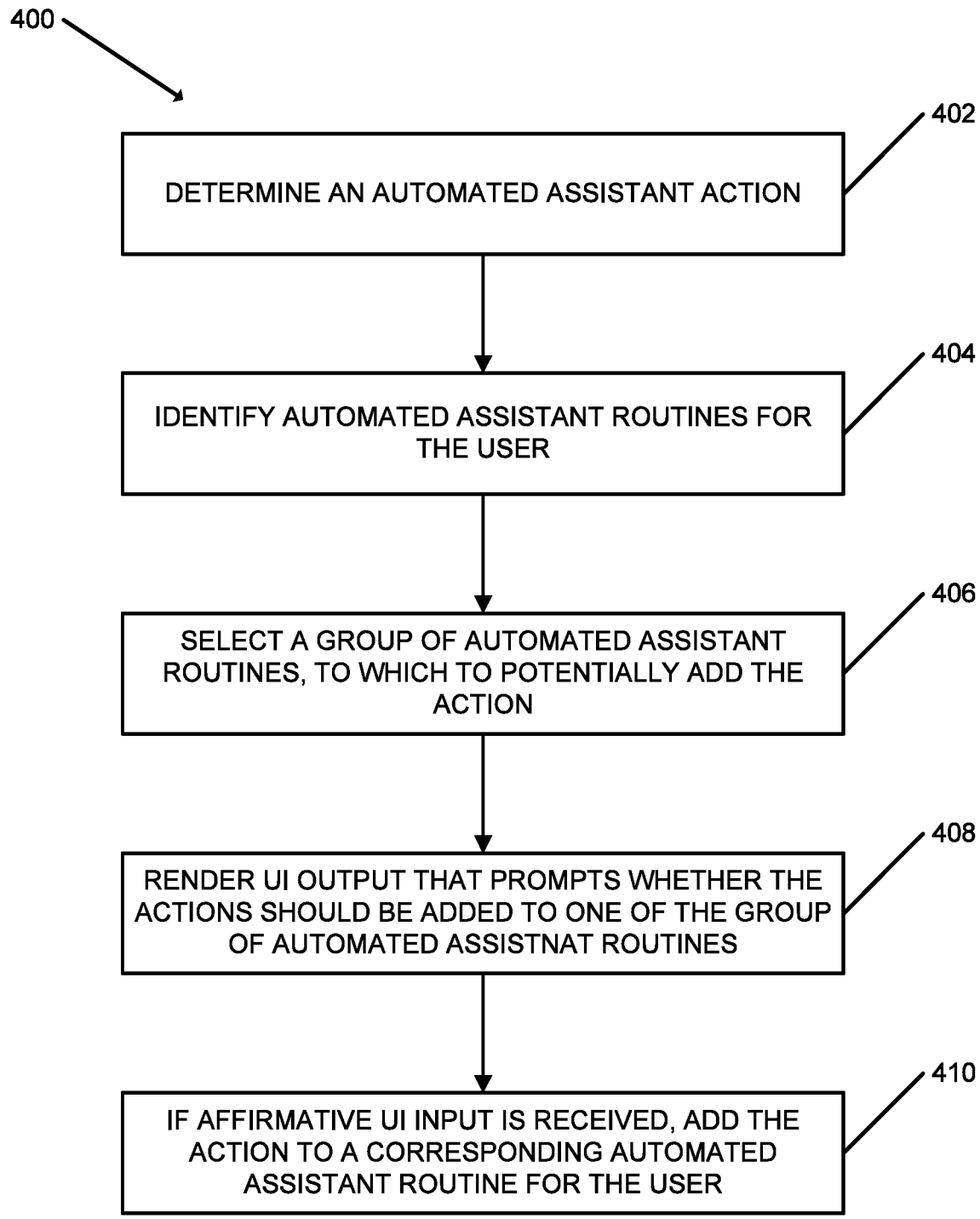
FIG. 4 is a flowchart illustrating an example process according to implementations disclosed herein.

A process for determining whether to add an action to an automatic assistant routine in accordance with various implementations is illustrated in FIG. 4. The process 400 can be performed by one or more client devices, and/or any other apparatus capable of interacting with an automated assistant. The process includes determining (402) an automated assistant action. In some implementations, the action can be determined based on having been performed one or more times in response to interaction by the user with the automated assistant. In some implementations, actions can include controlling a physical device (e.g., controlling a smart thermostat, turning on a smart coffee maker, controlling a smart speaker, etc.) and/or interacting with a remote agent (e.g., a calendar agent which can provide a user with a daily agent, a weather agent which can provide a user with the weather for the day etc.). In some implementations, the action can be determined based on having been performed by the user historically many times. For example, an action for control of certain smart lights can be determined based on a user controlling the certain smart lights every night before going to bed, through interaction with the automated assistant, through manual interaction, and/or through interaction with an app devoted to control of smart lights. The action can be determined based on being performed at least a threshold quantity of times. In some implementations, the automated assistant action can be determined even if the user has never caused performance of the action. For example, an action related to controlling a smart lock can be determined in response to determining that a smart lock has just been installed by a user and/or added to a topology of linked devices that are controllable by an automated assistant. For example, a user may have just installed a new, but the smart lock is not associated with any routines.

The automated assistant can identify (404) routines for the user. A user can have many routines, some of which can overlap. For example, a user can have a first "Good Morning" routine for the work week and a second "Good Morning" routine for the weekend. Additionally or alternatively, a user can have several routines to pick from when they arrive home from work. For example, a user can have a "Veg Out" routine and a "Read a Book" routine. In some implementations, a profile for a user can be identified, and the set of routines assigned to the profile for the user can be the identified set of routines associated with that user. In some of those implementations, the set of routines for the profile of the user are identified for the action determined at (402) based on determining the action at (402) was performed for the profile of the user. Any of a variety of sensors described above with respect to FIG. 1 can be used to identify a user profile associated with an input to an automated assistant (e.g., voice matching based on audio data), and the automated assistant routines associated with that user profile. In a variety of implementations, a set of routines can be shared between members of the same household. For example, a user and their spouse may enjoy cooking together and have a shared "Grilling Night" routine where both users interact with one or more automated assistant clients and one or more client devices. For example, the grilling night routine can include the action of turning on the lights in the kitchen, turning on the grill outside so it can begin warming up, and rendering speakers in both the kitchen and the outdoor grilling area to play the same music. Both users can interact with devices in the kitchen and the grill at various points in time. In some implementations, since it is a shared routine, the "Grilling Night" routine can be included on a user profile for both users and should be considered for both users when potentially adding new actions to new routines. Allowing one user to add an action to a shared routine can further share computational resources since both users will not have to manually go through the process of adding a new action to the shared routine.

A group of automated assistant routines can be selected (406), from the group of actions identified at (404), to which to potentially add the action identified at (402). For example, if the user is performing an action when they arrive home from work, the "Veg Out" routine and "Read a Book" routine are potential automated assistant routines to add to the action. However, the automated assistant can compare the action to those routine(s) and/or other routines, to select a group of the automated assistant routines that is a subset of all available automated assistant routines. For example, the "Veg Out" routine can include turning on the living room TV, and turning off the living room lights. In contrast, the "Read a Book" routine can include setting customized lighting for book reading in the study, and playing soft jazz music in the study. If the user action is to request information relating to current TV shows playing that evening, in many implementations, the automated assistant will select the routine which includes a TV for inclusion in the group to which to potentially add the action. Furthermore, for example, using a device topology of linked devices for the user, the automated assistant can determine there are no devices capable of display in the Study, the room that is associated with all of the actions for the "Book Reading" routine. As a result, the automated assistant can exclude the "Book Reading" routine from the group to which to potentially ad the action, as the action involves pushing information to a device capable of display, and the "Book Reading" routine is currently associated only with a room in which there are no display capable devices. In some implementations, an automated assistant can analyze the action and compare it with every action in every routine for the user and/or the location where the routine is generally performed to generate the group of routines to which to potentially add the action.

In some implementations, a potential action can be compared to many routines before selecting a routine (or group of routines) to potentially add the action. For example, a user can have four routines: "Party Time", "Good Morning", "Good Night", and "Drive Home". The "Party Time" routine can include the actions of rendering party music to speakers in the living room, adjusting networked lights in the living room to flash in a random colored pattern, and ordering a pizza for delivery via a third party agent from "Local Pizza Shop". The "Good Morning" routine can include the actions of rendering that day's schedule for the user, turning on networked lights in the bedroom, rendering that day's weather for a user, and rendering news headlines for a user. The "Good Night" routine for the user can include turning off all networked lights in the house, rendering tomorrow's schedule for the user, rendering tomorrow's weather for the user, and rendering white noise for two hours for the user. Additionally, the user's "Drive Home" routine can include the actions of rendering the evening schedule for the user, notifying the user's spouse on another client device the user is driving home, rendering information about group of user determined stock prices, and rendering a podcast for the remainder of the dive.

As an example, the automated assistant can review the four routines of the user and select which routine's to suggest adding the action of ordering a coffee from "Local Coffee Shop". In a variety of implementations, the automated assistant can analyze a variety of information for each routine including: actions included in the routine compared to the new action, a historical relationship (if any) between the new action and the routine, a temporal relationship (if any) between the new action and the routine, if other users generally have the action in similar routines, etc. With respect to the "Party Time" routine the automated assistant can compare the new action of ordering a coffee to the routine. Other users might generally order coffee before throwing a party (i.e., so they are awake during the party). The "Party Time" has inherent time constraints and needs to be run while "Local Pizza Shop" is open. A user may historically order coffee around the same time they run the "Party Time" routine (i.e., a user orders an afternoon cup of coffee when they are working at home but the user also throw parties around the same time in the afternoon) so historical data of when a user runs the "Party Time" routine can indicate it should be a suggestion to the user. However, the action of ordering a pizza for delivery from "Local Pizza Shop" conflicts with leaving the house to go pick up a cup of coffee (i.e., the user may not be home when the pizza gets delivered if they have left the house to go pick up a coffee order). Therefore, an automated assistant generally should not recommend adding the action of ordering a cup of coffee from "Local Coffee Shop" to the "Party Time" routine. Additionally or alternatively, in some implementations, an automated assistant can look at a user's historical actions after running the "Party Time" routine.

Similarly, the automated assistant can analyze the "Good Morning" routine compared to the new coffee ordering action. Other users generally order coffee in similar routines. "Local Coffee Shop" is likely to be open during the time the user runs their "Good Morning" routine. Additionally, no preexisting actions in the "Good Morning" routine conflict with ordering coffee (e.g., there is no turning on a coffee maker included in the "Good Morning" routine). Furthermore, the user's actions of ordering coffee in the mornings, around the same time the user runs the "Good Morning" routine can all be indicators to suggest adding the new action of making a coffee order from "Local Coffee Shop" to the "Good Morning" routine.

In contrast, the "Good Night" routine can be performed when "Local Coffee Shop" is closed which can be an indication to the assistant to not suggest adding the action. However, in some implementations an automated assistant can make a recommendation of another coffee shop to order coffee from if the user's preferred coffee shop is closed. Most users do not include ordering coffee in a similar evening routine, which can indicate to the automated assistant to not suggest the action. Additionally, user actions in the "Good Night" routine such as turning out networked lighting for the entire house followed by the action of playing white noise for two hours contradicts leaving the house to pick up a cup of coffee. The action of turning off the lights in the entire house in itself does not contradict picking up a cup of coffee, but the action paired with other actions in a "Good Night" routine contradicts leaving the house to pick up coffee.

Furthermore, the "Drive Home" routine can be compared to the new coffee ordering action. The user is already in the car driving, so there are no contradictions between any actions in the "Drive Home" routine and picking up a cup of coffee. However, the automated assistant generally reviews many factors before suggesting a routine to add a new action. The automated assistant can compared to similar routines of other users and see that most users do not order coffee in the evening when driving home from work. This can indicate to the automated assistant to not suggest adding the action to the "Drive Home" routine. Additionally, the user's historical actions of ordering coffee can be analyzed, and the automated assistant can see that the user never orders coffee after 3 pm and the user generally begins the "Drive Home" routine between 5 pm and 6 pm. The time the user performs the "Drive Home" routine would contradict with historical data about when a user orders coffee from "Local Coffee Shop". This can further indicate to the automated assistant to not suggest adding the new action of ordering coffee to the "Drive Home" routine.

Therefore, after analyzing all routines for the user, the automated assistant in this example should select the "Good Morning" routine to suggest adding the new action of ordering a cup of coffee from "Local Coffee Shop".

The automated assistant can render user interface output (408) that prompts whether the action should be added to any of the routines in the group of potential automated assistant routines. In some implementations, a user may add the same action to several routines. In some implementations, the user may want to add an action to a single routine. Furthermore, in some implementations, the user can asked if the action should be added to a routine after performing the action similar to FIG. 2 described above. Additionally or alternatively, the user can be asked if the action should be added to a routine after running a specific routine similar to FIG. 3 described above.

If affirmative user interface input is received (410) in response to the output at (408), the automatic assistant can add the action to a corresponding automated assistant routine. For example, if the output at (408) prompts whether the action should be added to a particular routine, a spoken utterance of "yes" can cause the action to be added to the particular routine. Also, for example, if the output at (408) prompts whether the action should be added to a first particular routine or a second particular routine, a spoken utterance of "the first one" can cause the action to be added to the first particular routine, but not the second particular routine; a spoken utterance of "the second one" can cause the action to be added to the second particular routine, but not the first particular routine; and a spoken utterance of "both" can cause the action to be added to both the first and second particular routines. In many implementations, the automated assistant can prompt the user with the name of particular routines, and the user can add an action to the routine by saying the name of the particular routine. For example, if the output (408) prompt the user suggestions to add a routine to a good morning routine and a drive to work routine, a spoken utterance of the name of the routine, for example, "Drive to Work" can cause the action to be added to the "Drive to Work" routine. In some implementations, the automated assistant can automatically add the action to the routine and can signal the user once the action has been added to the routine. In some implementations, the automated assistant can decide where in the sequence of actions in the preexisting routine to add the new action similar to the discussion in FIG. 2 above.

Figure 5:
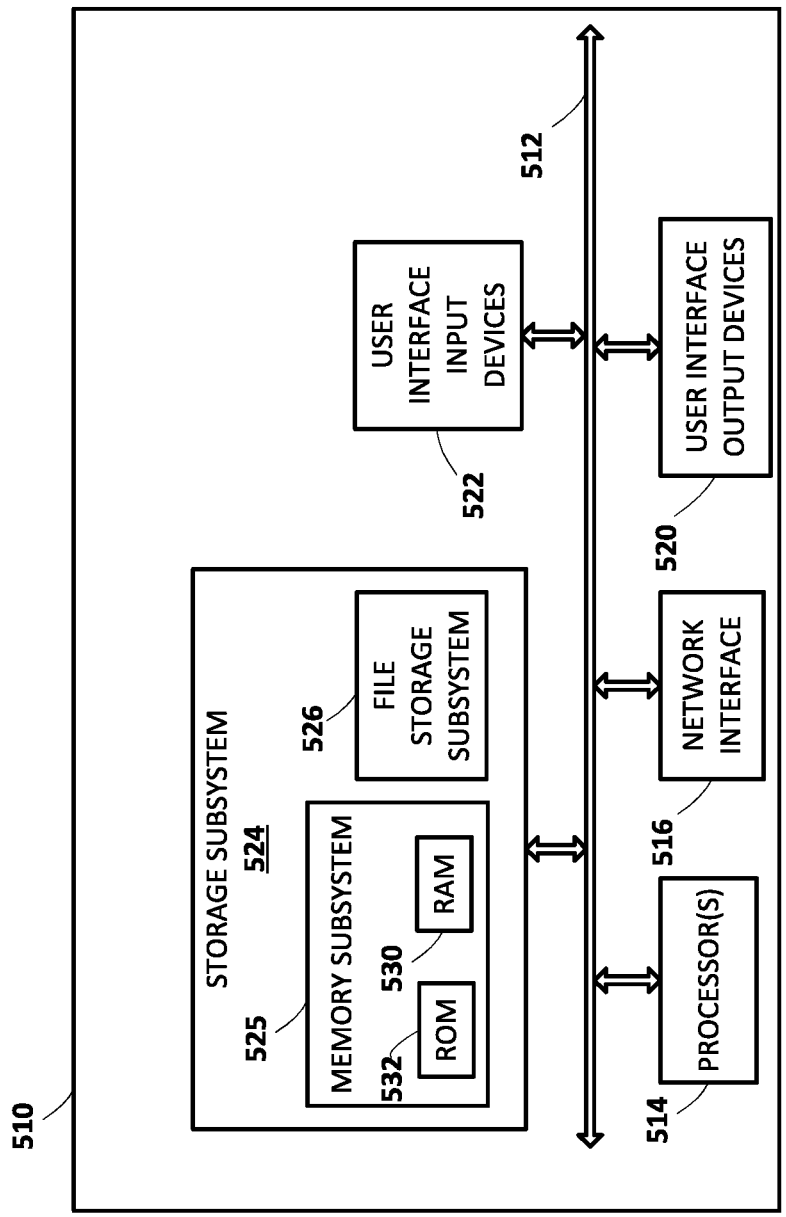
FIG. 5 is a block diagram illustrating an example architecture of a computing device.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of FIG. 1 and/or process 400, any operation(s) discussed herein, and/or to implement one or more of the cloud-based automated components 116, an automated assistant 112, the client device 102, and/or any other device or application discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

What is claimed is:

1. A method implemented by one or more processors, the method comprising:
    determining an action initiated by an automated assistant, the action initiated by the automated assistant in response to one or more instances of user interface input provided by a user via one or more automated assistant interfaces that interact with the automated assistant;
    identifying a plurality of automated assistant routines that are stored in association with the user, each of the automated assistant routines defining multiple corresponding actions to be automatically performed via the automated assistant in response to initialization of the automated assistant routine, wherein the action is in addition to the actions of the automated assistant routines;
    comparing the action to the plurality of automated assistant routines that are stored in association with the user, wherein comparing the action to the plurality of automated assistant routines that are stored in association with the user comprises:
        comparing at least one temporal attribute, of past occurrences of the action, to at least one corresponding temporal attribute of past occurrences of each of the automated assistant routines;
    selecting, based on the comparing, a subset of the automated assistant routines that are stored in association with the user;
    based on the action being initiated in response to user interface input provided by the user, and based on selecting the subset of the automated assistant routines:
        causing user interface output to be rendered via a client device of the user, wherein the user interface output prompts the user to add the action to one or more of the automated assistant routines of the subset;
    receiving affirmative user interface input in response to the user interface output, wherein the affirmative user interface input indicates a given routine of the automated assistant routines of the subset;
    in response to receiving the affirmative user interface input:
        automatically adding the action as an additional one of the multiple corresponding actions of the given routine to be automatically performed in response to initialization of the given routine; and
    in response to subsequent initialization of the automated assistant routine, causing performance of the multiple corresponding actions of the given routine, including causing performance of the action added as the additional one of the multiple corresponding actions of the given routine.

2. The method of claim 1, wherein the one or more instances of user interface input comprise one or more spoken utterances that, when converted to text, comprises first text of a first length; and wherein initialization of the given routine occurs in response to a given spoken utterance that, when converted to text, comprises second text of a second length, wherein the second length is shorter than the first length.

3. The method of claim 1 wherein causing the user interface output to be rendered via the client device of the user is further based on performing the given routine and occurs at a conclusion of performing the given routine.

4. The method of claim 3, wherein the one or more instances of user interface input that initiated the action comprise a spoken utterance, and further comprising:
    identifying a profile of the user based on one or more voice characteristics of the spoken utterance;
    wherein identifying the plurality of automated assistant routines that are stored in association with the user comprises identifying the plurality of automated assistant routines based on the plurality of automated assistant routines being stored in association with the profile of the user;
    wherein performing the given routine occurs in response to an additional spoken utterance from the user; and
    wherein causing the user interface output to be rendered via the client device of the user is further based on determining the additional spoken utterance has one or more voice characteristics that correspond to the profile of the user.

5. The method of claim 1, wherein causing the user interface output to be rendered via the client device of the user occurs at a conclusion of the action initiated by the automated assistant in response to the one or more instances of user interface input.

6. The method of claim 1, wherein the action includes providing a command to alter at least one state of a connected device that is managed by the automated assistant.

7. The method of claim 1, wherein the action includes providing a command to an agent controlled by a third party, wherein the third party is distinct from a party that controls the automated assistant.

8. The method of claim 1, wherein selecting the subset of the automated assistant routines comprises:
    comparing the action with each of the multiple corresponding actions in each of the automated assistant routines; and
    based on the comparing and for each of the automated assistant routines, determining if the action includes one or more contradictions with any of the multiple corresponding actions in the automated assistant routine; and
    selecting the subset of the automated assistant routines based on determining the multiple corresponding actions of the automated assistant routines of the subset lack the one or more contradictions with the action.

9. The method of claim 8, wherein the one or more contradictions include a temporal contradiction.

10. The method of claim 9, wherein the temporal contradiction includes being unable to complete the action during a time frame of each of the multiple corresponding actions.

11. The method of claim 9, wherein the one or more contradictions include a device incompatibility contradiction.

12. The method of claim 11, wherein the device incompatibility contradiction includes the action requiring a device having certain capabilities and each of the multiple corresponding actions not being associated with any device having the certain capabilities.

13. The method of claim 1, wherein automatically adding the action comprises determining a position for performing the action in the given routine, the position being relative to the multiple corresponding actions of the given routine.

14. The method of claim 13, wherein the position for performing the action is before the multiple corresponding actions, after the multiple corresponding actions, or between two of the multiple corresponding actions.

15. The method of claim 13, wherein the position is after the multiple corresponding actions and includes a temporal delay, wherein the temporal delay is based on one or more past temporal delays in past initiations of the action, by the user, following one or more past initiations of the given routine by the user.

16. The method of claim 1, wherein the one or more instances of user interface input that initiated the action are received via an additional client device that is linked to, but separate from, the client device via which the user interface output is rendered.

17. The method of claim 16, wherein the user interface output includes graphical output and further comprising:
selecting the additional client device for providing the user interface output based on determining the client device lacks display capabilities and the additional client device includes display capabilities.

18. The method of claim 1, wherein the one or more instances of user interface input that initiated the action comprise a spoken utterance, and further comprising:
identifying a profile of the user based on one or more voice characteristics of the spoken utterance;
wherein identifying the plurality of automated assistant routines that are stored in association with the user comprises identifying the plurality of automated assistant routines based on the plurality of automated assistant routines being stored in association with the profile of the user.

19. A method implemented by one or more processors, the method comprising:
determining an automated assistant action;
identifying a plurality of automated assistant routines that are stored in association with a user, each of the automated assistant routines defining multiple corresponding actions to be automatically performed via the automated assistant in response to initialization of the automated assistant routine, wherein the automated assistant action is in addition to the multiple corresponding actions of the automated assistant routines;
comparing the automated assistant action to the plurality of automated assistant routines that are stored in association with the user, wherein comparing the action to the plurality of automated assistant routines that are stored in association with the user comprises:
comparing at least one temporal attribute, of past occurrences of the action, to at least one corresponding temporal attribute of past occurrences of each of the automated assistant routines;
selecting, based on the comparing, a subset of the automated assistant routines that are stored in association with the user;
determining, based on sensor data from one or more sensors of a client device, that the user is interacting with the client device;
based on determining the user is interacting with the client device, and based on selecting the subset of the automated assistant routines:
causing user interface output to be rendered via the client device, wherein the user interface output prompts the user to add the automated assistant action to one or more of the automated assistant routines of the subset;
receiving affirmative user interface input in response to the user interface output, wherein the affirmative user interface input indicates a given routine of the automated assistant routines of the subset;
in response to receiving the affirmative user interface input:
adding the automated assistant action as an additional one of the multiple corresponding actions of the given routine to be automatically performed in response to initialization of the given routine; and
in response to subsequent initialization of the automated assistant routine, causing performance of the multiple corresponding actions of the given routine, including causing performance of the action added as the additional one of the multiple corresponding actions of the given routine.

20. The method of claim 19, wherein the sensor data includes voice data that is based on one or more microphones of the client device, and wherein determining that the user is interacting with the client device comprises:
determining one or more voice characteristics based on the voice data; and
identifying the user based on the voice characteristics conforming to a user profile of the user.

21. The method of claim 1,
wherein the action comprises controlling a particular connected device; and
wherein comparing the action to the plurality of automated assistant routines that are stored in association with the user further comprises:
comparing an action device topology attribute, of the particular connected device controlled by the action, to at least one corresponding routine device topology attribute for each of the automated assistant routines.

* * * * *